United States Patent
Kim et al.

(10) Patent No.: US 8,767,314 B2
(45) Date of Patent: Jul. 1, 2014

(54) ZOOM LENS AND PHOTOGRAPHING DEVICE HAVING THE SAME

(75) Inventors: Jin-woo Kim, Suwon-si (KR);
Young-ran Kim, Suwon-si (KR);
Dong-woo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/419,677

(22) Filed: Mar. 14, 2012

(65) Prior Publication Data
US 2013/0027785 A1 Jan. 31, 2013

(30) Foreign Application Priority Data
Jul. 28, 2011 (KR) .................. 10-2011-0075215

(51) Int. Cl.
*G02B 15/14* (2006.01)
*G02B 15/177* (2006.01)

(52) U.S. Cl.
CPC ................................. *G02B 15/177* (2013.01)
USPC ......................................................... 359/689

(58) Field of Classification Search
USPC .......................................... 359/680–682, 689
See application file for complete search history.

(56) References Cited

U.S. PATENT DOCUMENTS

| | | | |
|---|---|---|---|
| 7,791,819 B2 * | 9/2010 | Eguchi | ........................... 359/689 |
| 2005/0200970 A1 | 9/2005 | Nose et al. | |
| 2009/0244719 A1 | 10/2009 | Nakamura et al. | |
| 2010/0123959 A1 | 5/2010 | Kuroda et al. | |

FOREIGN PATENT DOCUMENTS

| | | |
|---|---|---|
| JP | 2004-318097 A | 11/2004 |
| JP | 2005-099091 A | 4/2005 |
| JP | 2005-258059 A | 9/2005 |
| JP | 2005-258064 A | 9/2005 |
| JP | 2005-258067 A | 9/2005 |
| JP | 2006-126806 A | 5/2006 |
| JP | 2006-208890 A | 8/2006 |
| JP | 2006-227197 A | 8/2006 |
| JP | 2006-301154 A | 11/2006 |
| JP | 2006-343534 A | 12/2006 |
| JP | 2007-155836 A | 6/2007 |
| JP | 2008-065124 A | 3/2008 |
| JP | 2008-241794 A | 10/2008 |
| JP | 2009-014931 A | 1/2009 |
| JP | 2009-037091 A | 2/2009 |
| JP | 2009-037092 A | 2/2009 |
| JP | 2009-169414 A | 7/2009 |
| JP | 2009-229516 A | 10/2009 |

(Continued)

*Primary Examiner* — Scott J Sugarman
*Assistant Examiner* — Robert E Tallman
(74) *Attorney, Agent, or Firm* — Drinker Biddle & Reath LLP

(57) ABSTRACT

A zoom lens and a photographing device including the zoom lens, the zoom lens including a first lens group having a negative refractive power, a second lens group having a positive refractive power, and a third lens group having a positive refractive power, which are sequentially arranged in the direction from an object side to an image side. During zooming from a wide angle position to a telephoto position, an interval between the first lens group and the second lens group decreases, and an interval between the second lens group and the third lens group increases. The first lens group comprises a first lens, a second lens being a negative lens formed of plastic, and a third lens being a positive lens formed of plastic. Therefore, the zoom lens is compact and low-priced and has a high magnification.

19 Claims, 10 Drawing Sheets

(56) References Cited

FOREIGN PATENT DOCUMENTS

| | | |
|---|---|---|
| JP | 2009-244473 A | 10/2009 |
| JP | 2009-251433 A | 10/2009 |
| JP | 2009-268024 A | 11/2009 |
| JP | 2009-276622 A | 11/2009 |
| JP | 2010-020236 A | 1/2010 |
| JP | 2010-049189 A | 3/2010 |
| JP | 2010-061007 A | 3/2010 |
| JP | 2010-091948 A | 4/2010 |
| JP | 2010-117532 A | 5/2010 |
| JP | 2010-117676 A | 5/2010 |
| JP | 2010-117677 A | 5/2010 |
| JP | 2010-122457 A | 6/2010 |
| JP | 2010-122625 A | 6/2010 |
| JP | 2010-134373 A | 6/2010 |
| JP | 2010-139831 A | 6/2010 |
| JP | 2010-191214 A | 9/2010 |

* cited by examiner

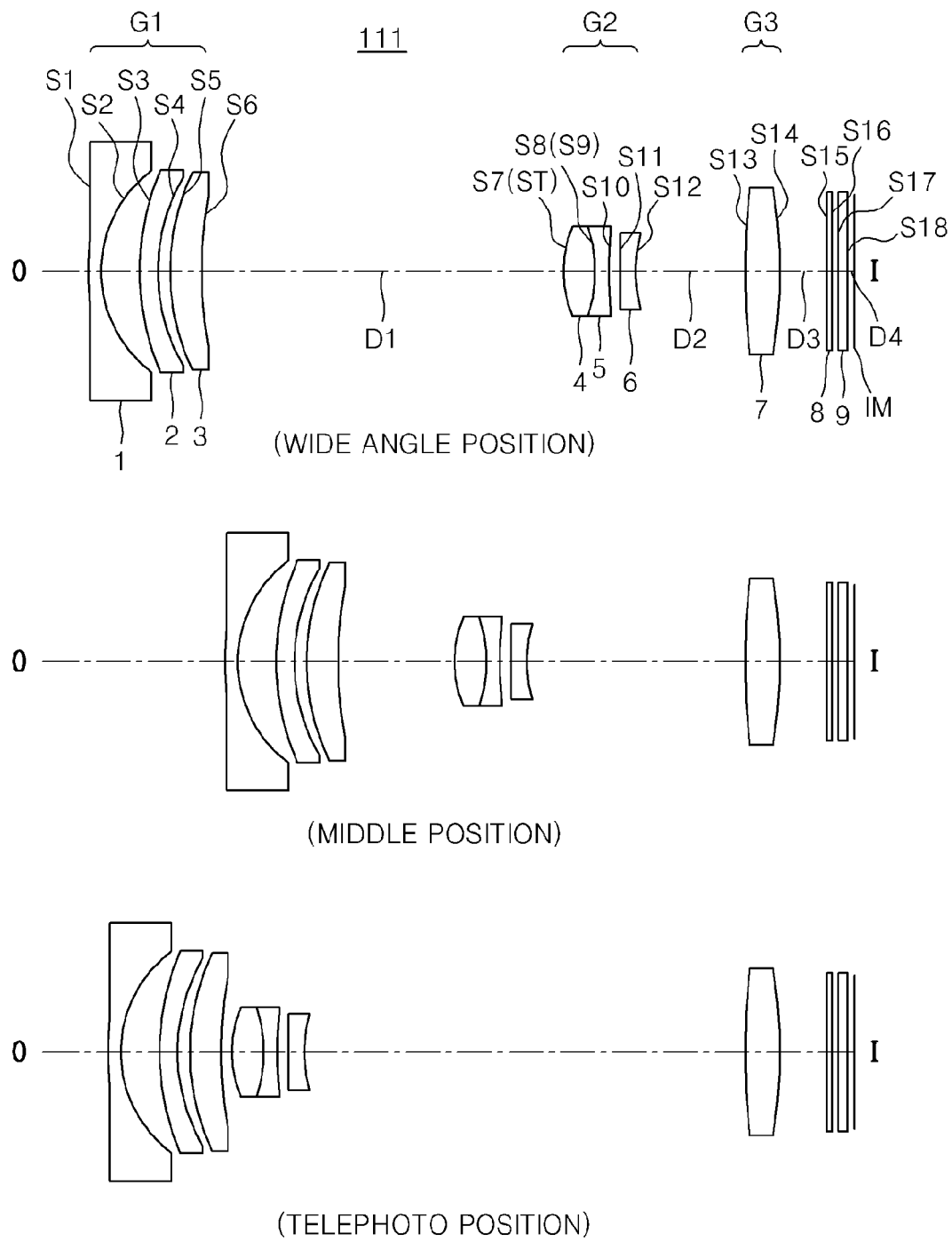

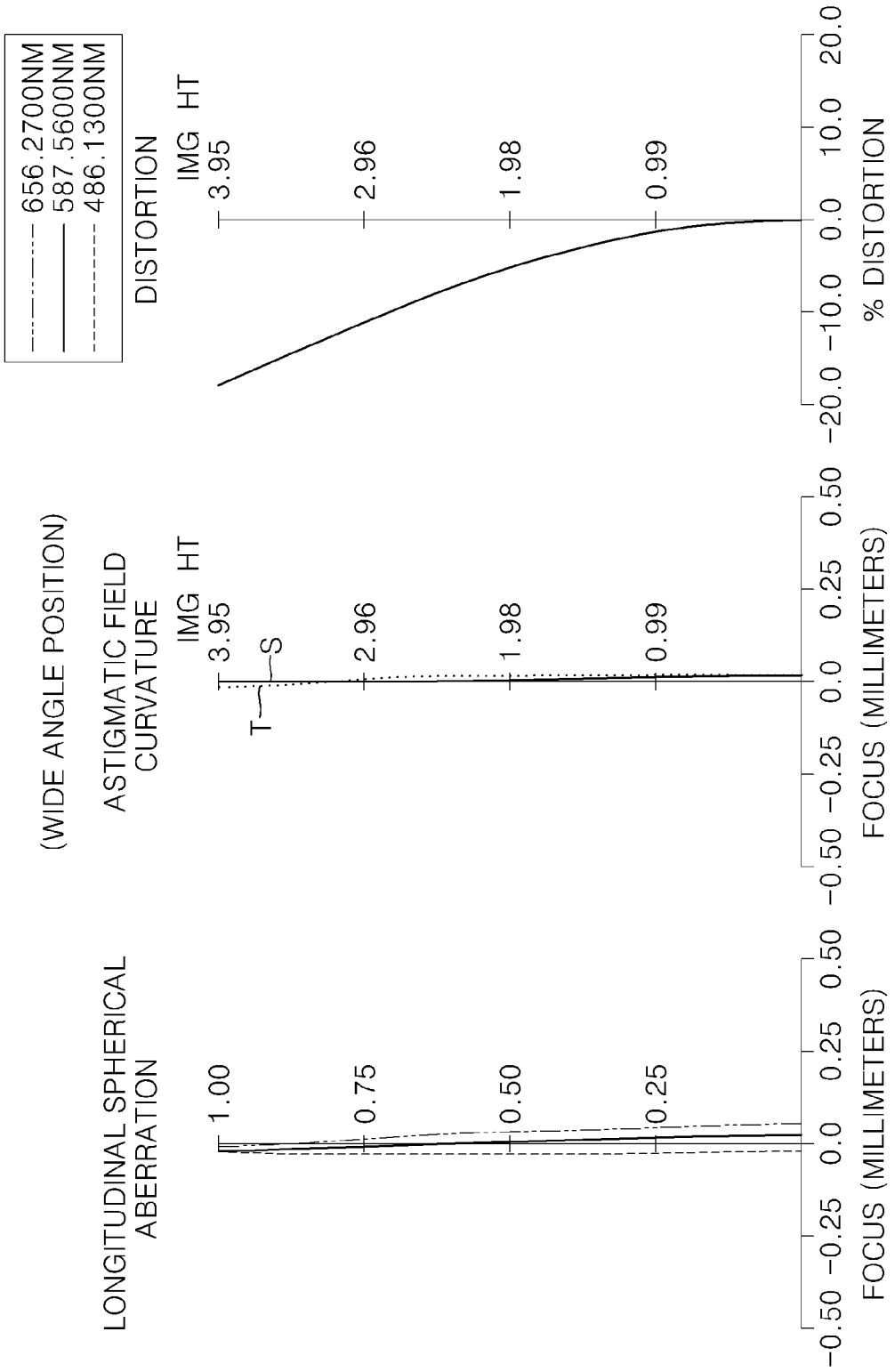

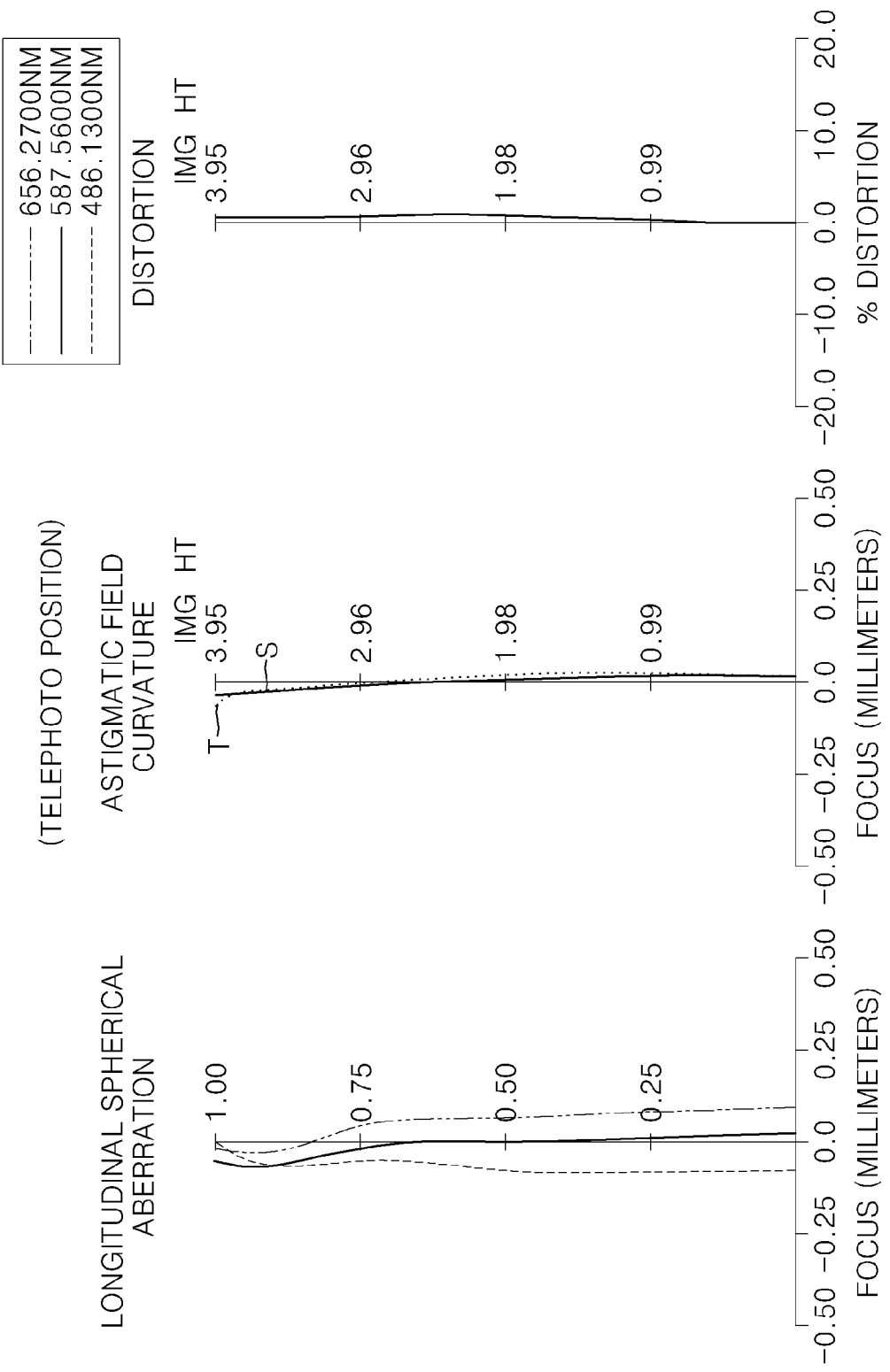

FIG. 3
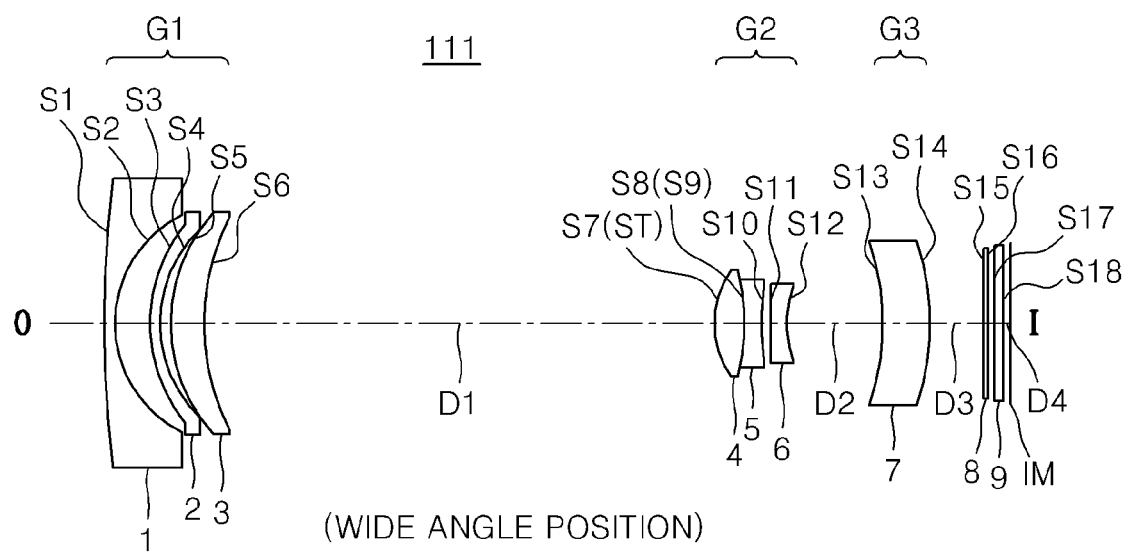
(WIDE ANGLE POSITION)
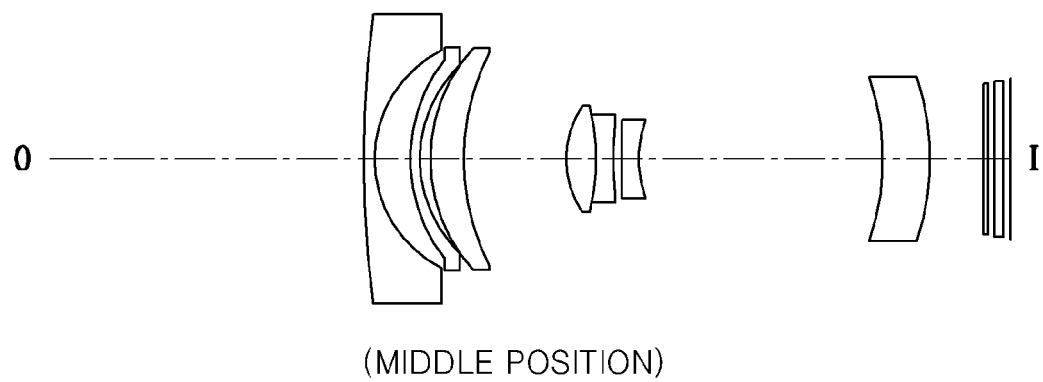
(MIDDLE POSITION)
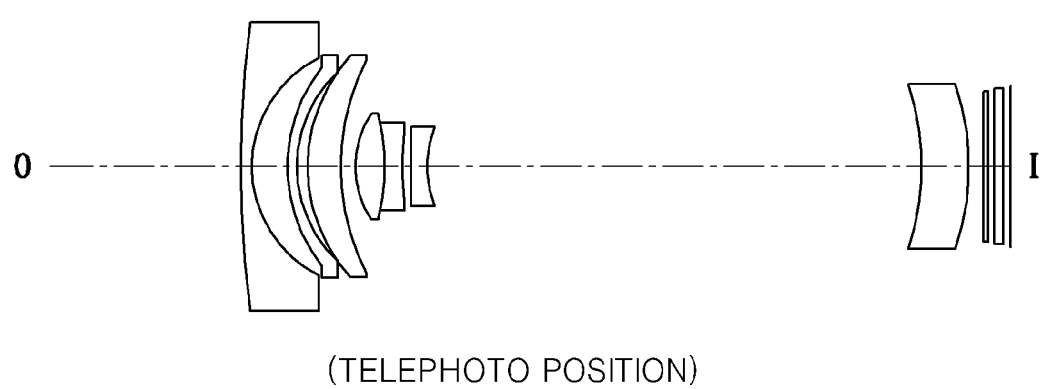
(TELEPHOTO POSITION)

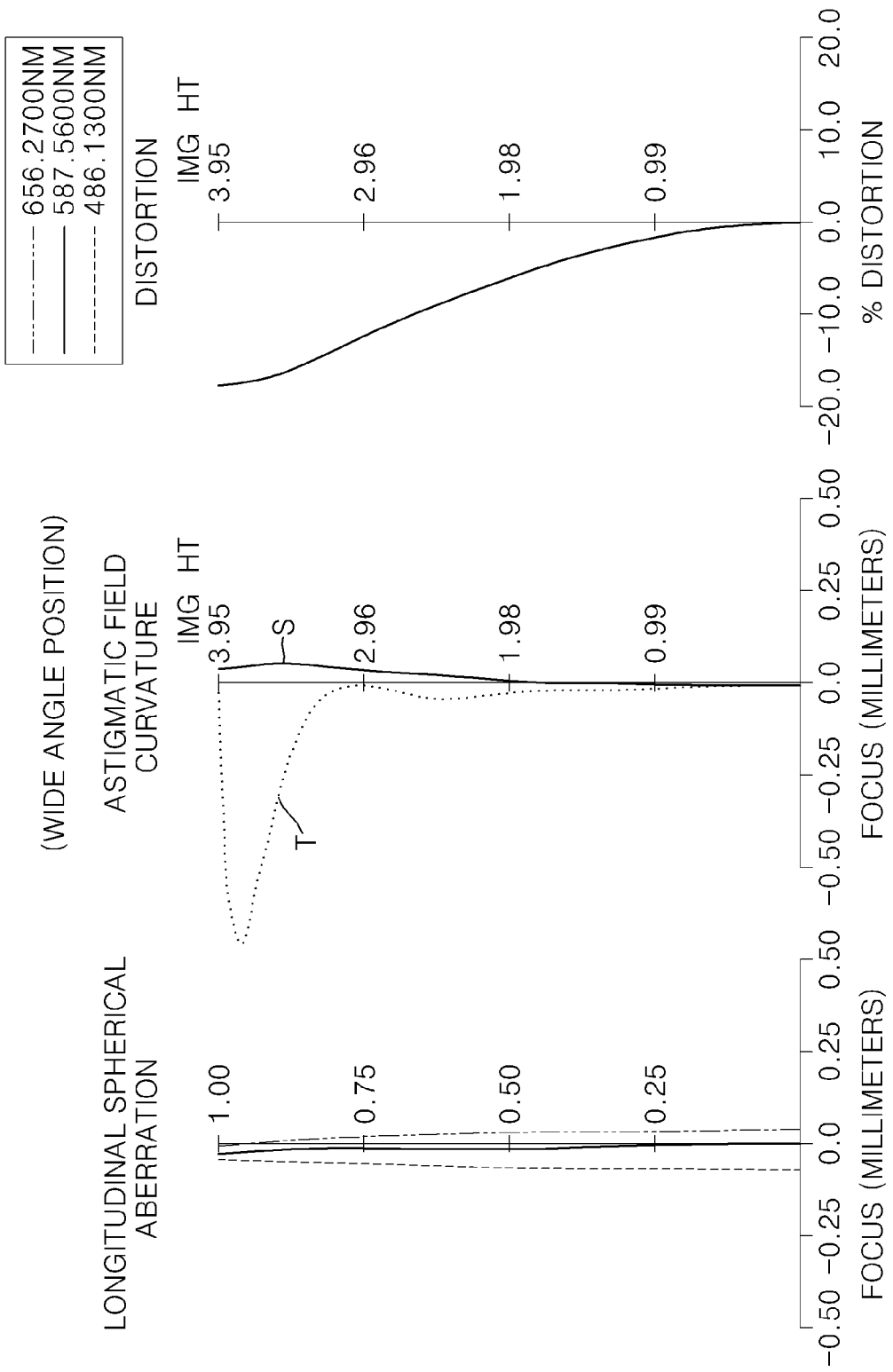

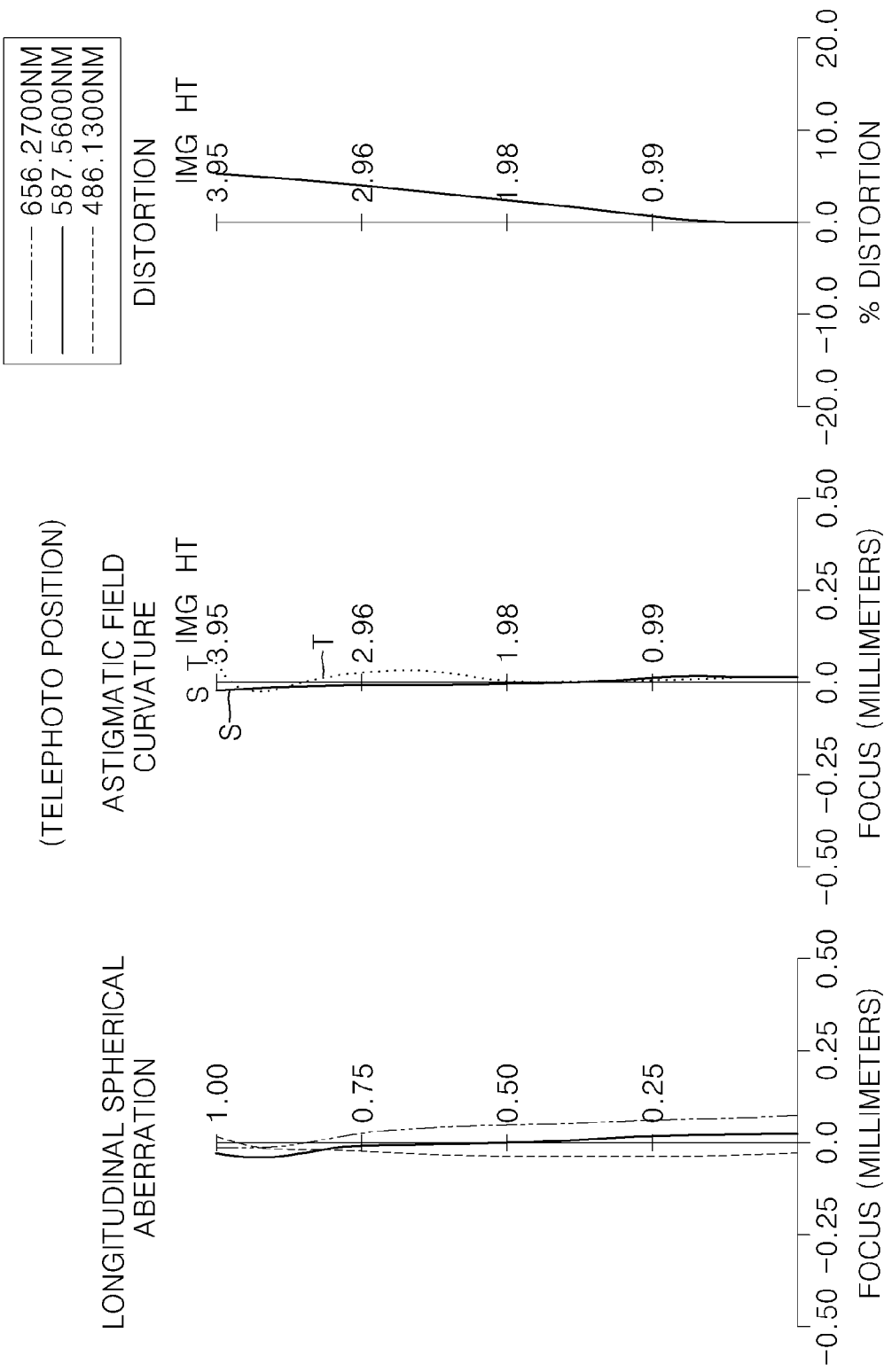

ZOOM LENS AND PHOTOGRAPHING DEVICE HAVING THE SAME

CROSS-REFERENCE TO RELATED PATENT APPLICATION

This application claims the benefit of Korean Patent Application No. 10-2011-0075215, filed on Jul. 28, 2011, in the Korean Intellectual Property Office, the disclosure of which is incorporated herein in its entirety by reference.

BACKGROUND

1. Field of the Invention

Embodiments of the invention relate to a small and low-priced zoom lens having a high zoom magnification, and a photographing device including the zoom lens.

2. Description of the Related Art

A small optical system having a high magnification has recently required a zoom lens for use in photographing devices such as digital cameras or digital camcorders that include image pickup devices, such as charge coupled devices (CCDs) or complementary metal-oxide semiconductors (CMOSs). Achievement of a high magnification hinders miniaturization, and miniaturization due to the use of a highly refractive aspherical lens increases the manufacturing costs of a zoom lens. As such, it is difficult to achieve miniaturization, high optical performance, and low manufacturing costs at the same time.

SUMMARY

Embodiments of the invention provide a zoom lens that is compact and low-priced and provides high magnification.

Embodiments of the invention also provide a photographing device including a zoom lens that is compact and low-priced and provides high magnification.

According to an aspect of the invention, there is provided a zoom lens comprising: a first lens group having a negative refractive power; a second lens group having a positive refractive power; and a third lens group having a positive refractive power, which are sequentially arranged in the direction from an object side to an image side. During zooming from a wide angle position to a telephoto position, the interval between the first lens group and the second lens group decreases, and the interval between the second lens group and the third lens group increases. The first lens group comprises a first lens, a second lens which is a negative lens formed of plastic, and a third lens which is a positive lens formed of plastic. The second lens group comprises a fourth lens, a fifth lens, and a sixth lens formed of plastic. The zoom lens satisfies the following expression:

$$4 \le \frac{ft}{fw} \le 7$$

where fw and ft denote the focal length of the zoom lens at the wide angle position and the focal length of the zoom lens at the telephoto position, respectively.

The zoom lens may satisfy the following expression:

$$1.0 < (Ra+Rb)/(Ra-Rb) < 19.3$$

where Ra denotes the radius of curvature of the surface of the second lens of the first lens group that faces the object side, and Rb denotes the radius of curvature of the surface of the second lens of the first lens group that faces the image side.

The zoom lens may satisfy the following expression:

$$2 \le |f1|/fw \le 3$$

where f1 denotes the focal length of the first lens group, and fw denotes the focal length of the zoom lens at the wide angle position.

The zoom lens may satisfy the following expression:

$$-4 \le Nf/Pf \le -1$$

where Nf denotes the focal length of the second lens of the first lens group, and Pf denotes the focal length of the third lens of the first lens group.

The zoom lens may satisfy the following expression:

$$30 \le Nvd-Pvd \le 60$$

where Nvd denotes the Abbe's number of the second lens of the first lens group, and Pvd denotes the Abbe's number of the third lens of the first lens group.

The zoom lens may satisfy the following expression:

$$3 \le f3/fw \le 13$$

where f3 denotes the focal length of the third lens group, and fw denotes the focal length of the zoom lens at the wide angle position.

The first lens, the second lens, and the third lens may be sequentially arranged in the direction from the object side to the image side.

The first lens of the first lens group may be a glass spherical lens.

The first lens of the first lens group may have a negative refractive power.

The sixth lens may be an aspherical lens.

The fourth lens may be a glass spherical lens.

The fifth lens may be a glass spherical lens.

The fourth and fifth lenses may be formed as a doublet lens.

The third lens group may comprise a plastic aspherical lens.

The second lens group may perform image blur.

The first lens may be a biconcave lens or a meniscus lens.

The second lens may be a meniscus lens which is convex toward the object side.

The third lens may be a meniscus lens which is convex toward the object side.

According to another aspect of the invention, there is provided a photographing device comprising: a zoom lens; and an imaging device for converting an image obtained by the zoom lens into an electrical image signal. The zoom lens comprises a first lens group having a negative refractive power, a second lens group having a positive refractive power, and a third lens group having a positive refractive power, which are sequentially arranged in the direction from an object side to an image side, during zooming from a wide angle position to a telephoto position, the interval between the first lens group and the second lens group decreases, and the interval between the second lens group and the third lens group increases, the first lens group comprises a first lens, a second lens being a negative lens formed of plastic, and a third lens being a positive lens formed of plastic, the second lens group comprises a fourth lens, a fifth lens, and a sixth lens formed of plastic, and the zoom lens satisfies the following expression:

$$4 \le \frac{ft}{fw} \le 7$$

where $f_w$ and $f_t$ denote the focal length of the zoom lens at the wide angle position and the focal length of the zoom lens at the telephoto position, respectively.

BRIEF DESCRIPTION OF THE DRAWINGS

The above and other features and advantages of the invention will become more apparent by describing in detail exemplary embodiments thereof with reference to the attached drawings in which:

FIG. 1 illustrates optical arrangements of a zoom lens at a wide angle position, at a middle position, and at a telephoto position, according to an embodiment of the invention;

FIGS. 2A and 2B illustrate longitudinal spherical aberration, astigmatic field curves, and distortion of the zoom lens illustrated in FIG. 1, at a wide angle position and at a telephoto position, respectively;

FIG. 3 illustrates optical arrangements of a zoom lens at a wide angle position, at a middle position, and at a telephoto position, according to another embodiment of the invention;

FIGS. 4A and 4B illustrate longitudinal spherical aberration, astigmatism, and distortion of the zoom lens illustrated in FIG. 3, at the wide angle position and at the telephoto position, respectively;

FIGS. 6A and 6B illustrate longitudinal spherical aberration, astigmatic field curves, and distortion of the zoom lens illustrated in FIG. 5, at the wide angle position and at the telephoto position, respectively.

DETAILED DESCRIPTION

Figure 4B:
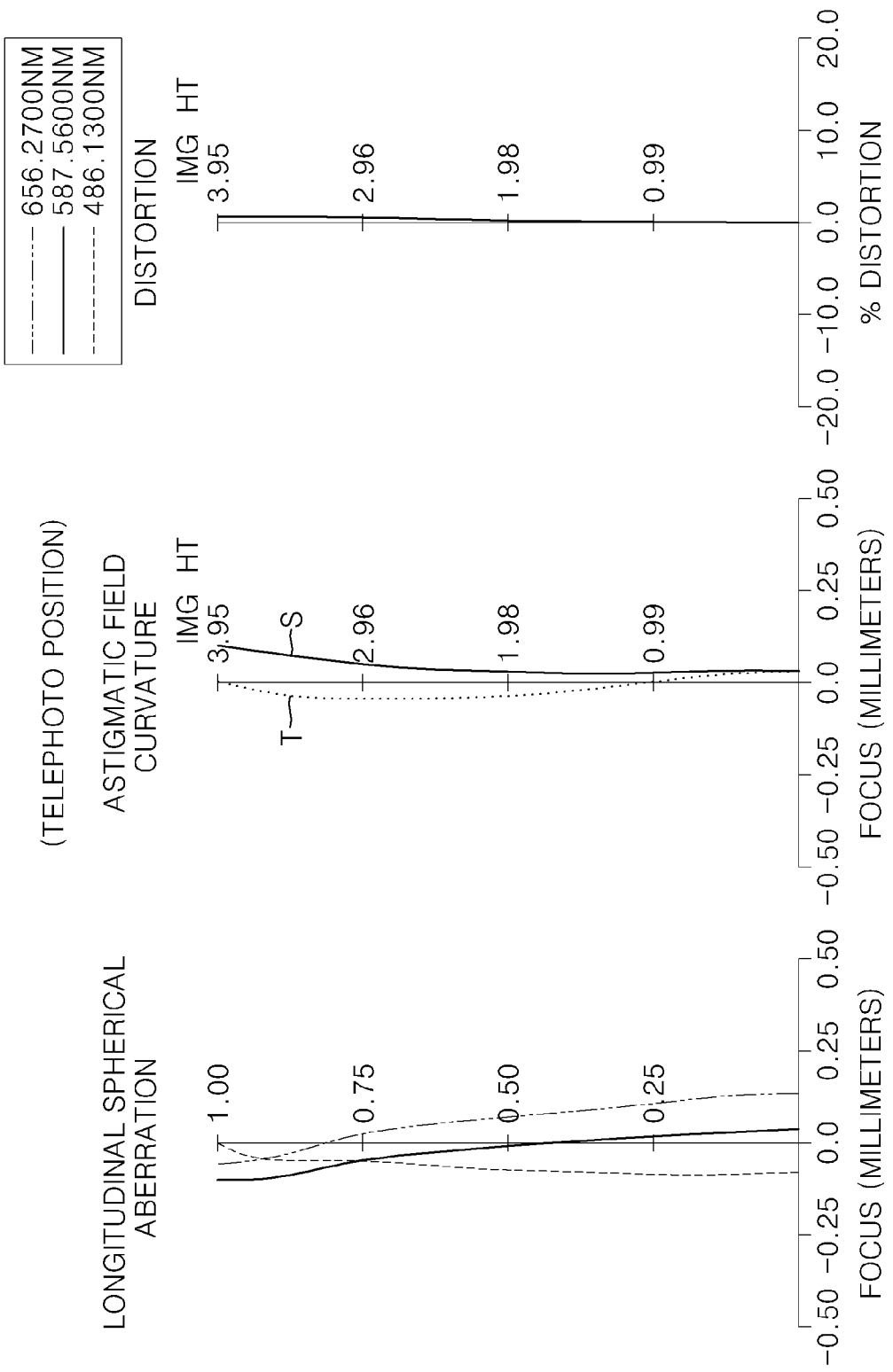

Zoom lenses and photographing devices including the same according to embodiments of the invention will now be described in detail with reference to the accompanying drawings.

FIG. 1 illustrates a zoom lens 111 according to an embodiment of the invention.

Referring to FIG. 1, the zoom lens 111 include a first lens group G1 having a negative refractive power, a second lens group G2 having a positive refractive power, and a third lens group G3 having a positive refractive power, which are sequentially arranged in the direction from an object side O to an image side I. When zooming is performed from a wide angle position to a telephoto position, the distance between the first and second lens groups G1 and G2 may decrease and the distance between the second and third lens groups G2 and G3 may increase. The third lens group G3 may perform focusing by performing image plane movement and focus location correction during zooming.

The first lens group G1 may include a first lens 1, a second lens 2, and a third lens 3 that are sequentially arranged from the object side O to the image side I. The second lens 2 may be a negative lens formed of plastic, and the third lens 3 may be a positive lens formed of plastic. The second and third lenses 2 and 3 may reduce the manufacturing costs of the zoom lens by being formed of plastic. The second and third lenses 2 and 3 may also facilitate corrections of lateral chromatic aberration at a telephoto position and astigmatism. For example, the second and third lenses 2 and 3 may be each a meniscus lens that is convex toward the object side O.

The first lens 1 may be a glass spherical lens, for example. When the lens of the first lens group G1 that is closest to the object side O is formed of a highly-refractive aspherical lens, astigmatism at the wide angle position and distortion may be easily corrected. However, in general, the lens of the first lens group G1 that is closest to the object side O may increase the manufacturing costs of the zoom lens because it has the largest exterior diameter from among the lenses of the entire zoom lens. Accordingly, the first lens 1, which is the lens closest to the object side O from among the lenses of the zoom lens, may be formed of a glass spherical lens so as to reduce the manufacturing costs of the zoom lens. The first lens 1 may be formed of a glass lens so as to protect the zoom lens from damage, wear, or the like caused by an external environment. The first lens 1 may have a negative refractive power. The first lens 1 may be, for example, a biconcave lens or a meniscus lens. The first lens 1 may be a meniscus lens that is convex toward the object side O.

The second lens group G2 may include at least one plastic lens. For example, the second lens group G2 may include a fourth lens 4, a fifth lens 5, and a sixth lens 6. An aperture stop ST may be included in the second lens group G2. For example, the stop ST may be disposed in the second lens group G2 so as to be closest to the object side O. For example, the stop ST may be disposed on a surface of the fourth lens 4 that faces the object side O. The stop ST may move together with the second lens group G2 during zooming. The fourth and fifth lenses 4 and 5 may be both glass spherical lenses. The sixth lens 6 may be a plastic aspherical lens. The second lens group G2 may not use a glass aspherical lens so as to reduce the manufacturing costs of the zoom lens. The third and fourth lenses 3 and 4 may be formed as a doublet lens in order to make the zoom lens compact. The doublet lens may control chromatic aberration and achieve small chromatic aberration even at high magnification. The fourth lens 4 may be a positive lens, the fifth lens 5 may be a negative lens, and the sixth lens 6 may be a negative lens.

The third lens group G3 may include a seventh lens 7. The seventh lens 7 may be a glass aspherical lens, for example. The seventh lens 7 may have a positive refractive power. The seventh lens 7 may be formed of a plastic aspherical lens so as to reduce a change of peripheral field curvature according to a change of an object distance without increasing an angle at which light is incident upon an image plane IM.

The third lens group G3 may be formed of a single lens, so that the zoom lens is compact.

According to an embodiment of the invention, the second and third lenses of a first lens group are formed of plastic aspherical lenses so as to control distortion, lateral aberration, and curvature. The second lens group G2 may use a plastic lens and thus control spherical aberration without using a special glass aspherical lens. The third lens group G3 may use a plastic aspherical lens having a positive refractive power so as to control the angle at which light is incident upon the image plane IM and to minimize a change in peripheral resolution caused by Auto Focusing (AF).

A zoom lens according to an embodiment of the invention may have a zoom magnification given by Expression 1 below:

$$4 \leq \frac{ft}{fw} \leq 7 \qquad \text{[Expression 1]}$$

where fw and ft denote the focal length of the zoom lens at the wide angle position and the focal focal length of the zoom lens at the telephoto position, respectively. The zoom magnification of Expression 1 is obtained by dividing the optical overall length of the zoom lens at the wide angle position by the overall focal length of the zoom lens at the wide angle position. A zoom lens having a negative lens, a positive lens, and another positive lens may secure a zoom magnification of 4× or greater. However, when the zoom magnification exceeds an upper limit of 7, chromatic aberration at the telephoto position makes it difficult to secure optical performance, and the amount of movement of each lens group is greatly increased during zooming, thus making it difficult to form a small lens barrel.

The zoom lens according to an embodiment of the invention may also be manufactured to satisfy Expression 2 below:

$$1.0<(Ra+Rb)/Ra-Rb)<19.3 \quad \text{[Expression 2]}$$

where Ra denotes the radius of curvature of the surface of the second lens of the first lens group that faces the object side, and Rb denotes the radius of curvature of the surface of the second lens of the first lens group that faces the image side. The zoom lens may be miniaturized by satisfying Expression 2. When (Ra+Rb)/Ra−Rb) exceeds a lower limit of Expression 2, miniaturization of the zoom lens and control of optical performance may be difficult. When (Ra+Rb)/Ra−Rb) exceeds an upper limit of Expression 2, it is difficult to compensate for decentration during centering.

The zoom lens according to an embodiment of the invention may also be manufactured to satisfy Expression 3 below:

$$2 \leq |f1|/fw \leq 3 \quad \text{[Expression 3]}$$

where f1 denotes the focal length of the first lens group, and fw denotes the focal length of the zoom lens at the wide angle position. When |f1|/fw exceeds the lower limit of Expression 1, the refractive power of the first lens group becomes too high, astigmatic field curvature and distortion at a wide angle position and spherical aberration and coma at the telephoto position are greatly generated. It is difficult to correct the astigmatic field curvature, the distortion, the spherical aberration, and the coma by using the second and third lenses formed of plastic. When |f1|/fw exceeds the upper limit of Expression 1, retrofocus type refractive power arrangement may be difficult, and the power of the first lens group decreases, so that securing a back focal length may be difficult.

The zoom lens according to an embodiment of the invention may also be manufactured to satisfy Expression 4 below:

$$-4 \leq Nf/Pf \leq -1 \quad \text{[Expression 4]}$$

where Nf denotes the focal length of the second lens of the first lens group, and Pf denotes the focal length of the third lens of the first lens group. When Nf/Pf exceeds the lower limit of Expression 4, the refractive power of the second lens decreases, and thus aberration correction is difficult. When Nf/Pf exceeds the upper limit of Expression 4, the refractive power of the second lens greatly increases, and thus it is difficult to obtain such a high refractive power by using a plastic lens.

The zoom lens according to an embodiment of the invention may also be manufactured to satisfy Expression 5 below:

$$30 \leq Nvd - Pvd \leq 60 \quad \text{[Expression 5]}$$

where Nvd denotes the Abbe's number of the second lens of the first lens group, and Pvd denotes the Abbe's number of the third lens of the first lens group.

When the value of (Nvd−Pvd) exceeds the lower limit of Expression 5, chromatic aberration control is difficult. When the value of (Nvd−Pvd) exceeds the upper limit of Expression 5, it is difficult to form the second and third lenses by using plastic lenses.

The zoom lens according to an embodiment of the invention may also be manufactured to satisfy Expression 6 below:

$$3 \leq f3/fw \leq 13 \quad \text{[Expression 6]}$$

where f3 denotes the focal length of the third lens group, and fw denotes the focal length of the zoom lens at the wide angle position.

When (f3/fw) exceeds the lower limit of Expression 6, the refractive power of the third lens group greatly increases, and a variation of aberration increases when performing image plane correction according to a change of the object distance. When (f3/fw) exceeds the upper limit of Expression 6, the distance the third lens group needs to move along an optical axis during focusing increases, and thus miniaturization of the zoom lens may be difficult.

The zoom lens 111 according to an embodiment of the invention may correct optical image blur by moving the second lens group G2. The second lens group G2 needs to correct image blur so as to form a good image and correct spherical aberration and a Petzval sum during lens shift. Therefore, decentration coma, which is generated at the center of a screen when an image blur correction lens group is shifted vertically along an optical axis, and spherical aberration may be prevented. In addition, astigmatic field curvature, which is generated at the periphery of the screen when the image blur correction lens group is shifted vertically along the optical axis, may be prevented by correcting the Petzval sum.

The term "aspherical" described in the embodiments of the invention is defined as follows.

The aspherical shape of a lens according to an embodiment of the invention may be expressed as in Expression 7, by making a traveling direction of light be positive when the direction of the optical axis is an axis x and a direction perpendicular to the direction of the optical axis is an axis y:

$$x = \frac{cy^2}{1+\sqrt{1-(K+1)c^2y^2}} + Ay^4 + By^6 + Cy^8 + Dy^{10} \quad \text{[Expression 7]}$$

where x denotes the distance from the vertex of a lens along the optical axis, y denotes the distance from the vertex of the lens in a direction perpendicular to the optical axis, K denotes a conic constant, A, B, C, and D denote aspherical coefficients, and c denotes a reciprocal (1/R) of the radius of curvature of the vertex of the lens.

Miniaturization and price lowering of the zoom lens can be achieved in the following embodiments based on various designs.

In the following lens data, f denotes the focal length of the zoom lens, Fno denotes the F number, 2ω denotes a viewing angle, R denotes the radius of curvature, Dn denotes the thickness of the center of a lens or an interval between lenses, Nd denotes a refractive index, and Vd denotes the Abbe's number. ST denotes an aperture stop, D1, D2, D3, and D4 denote variable distances between lenses, and * denotes an aspherical surface. In the following embodiments, like lenses included in each lens group are indicated by like reference characters. In each embodiment, the unit of distance is mm. Reference numerals 8 and 9 may indicate filters or cover glass.

Embodiment 1

FIG. 1 illustrates optical arrangements of a zoom lens at a wide angle position, at a middle position, and at a telephoto position, according to Embodiment 1.

TABLE 1 f: 4.70~10.34~22.33 Fno: 2.86~4.10~6.82 2ω: 80.08~41.84~20.06

| Lens surface | Radius of curvature (R) | Thickness (Dn) | Refractive index (Nd) | Abbe's number (Vd) |
|---|---|---|---|---|
| S1 | 210.653 | 0.600 | 1.603 | 60.7 |
| S2 | 6.395 | 2.060 | | |
| S3* | 10.802 | 0.92 | 1.544 | 56.0 |

TABLE 1-continued f; 4.70~10.34~22.33 Fno; 2.86~4.10~6.82 2ω; 80.08~41.84~20.06

| Lens surface | Radius of curvature (R) | Thickness (Dn) | Refractive index (Nd) | Abbe's number (Vd) |
|---|---|---|---|---|
| S4* | 7.525 | 0.660 | | |
| S5* | 8.876 | 1.590 | 1.634 | 23.9 |
| S6* | 16.726 | D1 | | |
| S7 (ST) | 5.298 | 1.610 | 1.804 | 46.5 |
| S8 | −9.628 | 0.005 | 1.514 | 42.8 |
| S9 | −9.628 | 0.800 | 1.699 | 30.1 |
| S10 | 18.153 | 0.520 | | |
| S11* | 57.367 | 0.870 | 1.634 | 23.9 |
| S12* | 9.298 | D2 | | |
| S13* | 36.239 | 1.850 | 1.544 | 56.0 |
| S14* | −15.888 | D3 | | |
| S15 | infinity | 0.300 | 1.517 | 64.2 |
| S16 | infinity | 0.300 | | |
| S17 | infinity | 0.500 | 1.517 | 64.2 |
| S18 | infinity | D4 | | |

Data about the aspherical coefficient of the zoom lens according to Embodiment 1 is as follows.

TABLE 2

| Lens surface | K | A | B | C | D |
|---|---|---|---|---|---|
| S3 | −1.000000 | 4.303750E−04 | −4.944706E−05 | 9.962142E−07 | −3.465797E−09 |
| S4 | −1.000000 | 4.389406E−04 | −5.357607E−05 | 5.107936E−07 | 5.970346E−09 |
| S5 | −1.000000 | −2.614729E−04 | 1.658909E−05 | −8.600491E−07 | 3.502732E−09 |
| S6 | −1.000000 | −5.409022E−04 | 1.334616E−05 | −3.429275E−07 | −5.836463E−09 |
| S11 | −1.000000 | 1.958219E−03 | −2.418694E−04 | 3.964571E−05 | −4.643568E−06 |
| S12 | −1.000000 | 5.356781E−03 | −6.621200E−05 | 4.656756E−05 | −4.737555E−06 |
| S13 | −1.000000 | 4.594606E−04 | −2.805425E−05 | 8.392772E−07 | 0.000000E+00 |
| S14 | −1.000000 | 1.056299E−03 | −7.175277E−05 | 2.487669E−06 | −2.450463E−08 |

Data about the variable distance during zooming is as follows.

TABLE 3

| Variable distance | Wide angle position | Middle position | Telephoto position |
|---|---|---|---|
| D1 | 18.933 | 6.118 | 0.551 |
| D2 | 5.647 | 11.325 | 23.490 |
| D3 | 2.453 | 2.453 | 1.900 |
| D4 | 0.400 | 0.400 | 0.400 |

FIGS. 2A and 2B illustrate longitudinal spherical aberration, astigmatic field curves, and distortion of the zoom lens according to Embodiment 1, at the wide angle position and at the telephoto position, respectively. Astigmatic field curvatures include a tangential field curvature T and a sagittal field curvature S.

Embodiment 2

FIG. 3 illustrates optical arrangements of a zoom lens at the wide angle position, at the middle position, and at the telephoto position, according to Embodiment 2. Design data of Embodiment 2 is as follows.

TABLE 4 f; 4.65~15.25~31.85 Fno; 3.16~5.28~8.71 2ω; 81.36~38.08~26.26

| Lens surface | Radius of curvature (R) | Thickness (Dn) | Refractive index (Nd) | Abbe's number (Vd) |
|---|---|---|---|---|
| S1 | 73.607 | 0.500 | 1.601 | 45.9 |
| S2 | 6.391 | 1.952 | | |
| S3* | 5.525 | 0.5 | 1.544 | 56.0 |
| S4* | 4.347 | 0.607 | | |
| S5* | 6.324 | 1.774 | 1.634 | 23.9 |
| S6* | 9.513 | D1 | | |
| S7 (ST) | 5.292 | 1.592 | 1.804 | 46.5 |
| S8 | −9.637 | 0.005 | | |
| S9 | −9.637 | 0.835 | 1.697 | 3147.0 |

TABLE 4-continued f; 4.65~15.25~31.85 Fno; 3.16~5.28~8.71 2ω; 81.36~38.08~26.26

| Lens surface | Radius of curvature (R) | Thickness (Dn) | Refractive index (Nd) | Abbe's number (Vd) |
|---|---|---|---|---|
| S10 | 18.777 | 0.523 | | |
| S11* | 42.792 | 0.870 | 1.634 | 23.9 |
| S12* | 8.699 | D2 | | |
| S13* | −9.000 | 2.541 | 1.544 | 56.0 |
| S14* | −7.770 | D3 | | |
| S15 | infinity | 0.300 | 1.517 | 64.2 |
| S16 | infinity | 0.300 | | |
| S17 | infinity | 0.500 | 1.517 | 64.2 |
| S18 | infinity | D4 | | |

Data about the aspherical coefficient of the zoom lens according to Embodiment 2 is as follows.

TABLE 5

| Lens surface | K | A | B | C | D |
|---|---|---|---|---|---|
| S3 | −1.000000 | 4.635759E−04 | −1.232675E−04 | 3.646962E−06 | −4.062606E−08 |
| S4 | −1.000000 | 3.807519E−04 | −1.062624E−04 | 2.229916E−06 | −2.529962E−08 |
| S5 | −1.000000 | −7.473917E−04 | 5.354297E−05 | −1.511002E−06 | 6.466865E−09 |
| S6 | −1.000000 | −1.096028E−03 | 3.297691E−05 | 2.864673E−08 | −1.344152E−08 |
| S11 | −1.000000 | 1.461338E−03 | −1.282325E−04 | 1.030348E−05 | −1.280909E−06 |

TABLE 5-continued

| Lens surface | K | A | B | C | D |
|---|---|---|---|---|---|
| S12 | −1.000000 | 4.899971E−03 | 7.256534E−05 | 1.174793E−05 | −4.278331E−07 |
| S13 | 0.000000 | 1.791663E−03 | −3.088315E−05 | 0.000000E+00 | 0.000000E+00 |
| S14 | −1.000000 | 2.182770E−03 | −1.924950E−05 | −1.706814E−06 | 3.996549E−08 |

Data about the variable distance of the zoom lens according to Embodiment 2 during zooming is as follows.

TABLE 6

| Variable distance | Wide angle position | Middle position | Telephoto position |
|---|---|---|---|
| D1 | 27.024 | 5.356 | 0.550 |
| D2 | 5.023 | 12.851 | 26.236 |
| D3 | 2.790 | 2.792 | 0.731 |
| D4 | 0.400 | 0.400 | 0.400 |

FIGS. 4A and 4B illustrate longitudinal spherical aberration, astigmatic field curves, and distortion of the zoom lens according to Embodiment 2, at the wide angle position and at the telephoto position, respectively.

Embodiment 3

Figure 5:
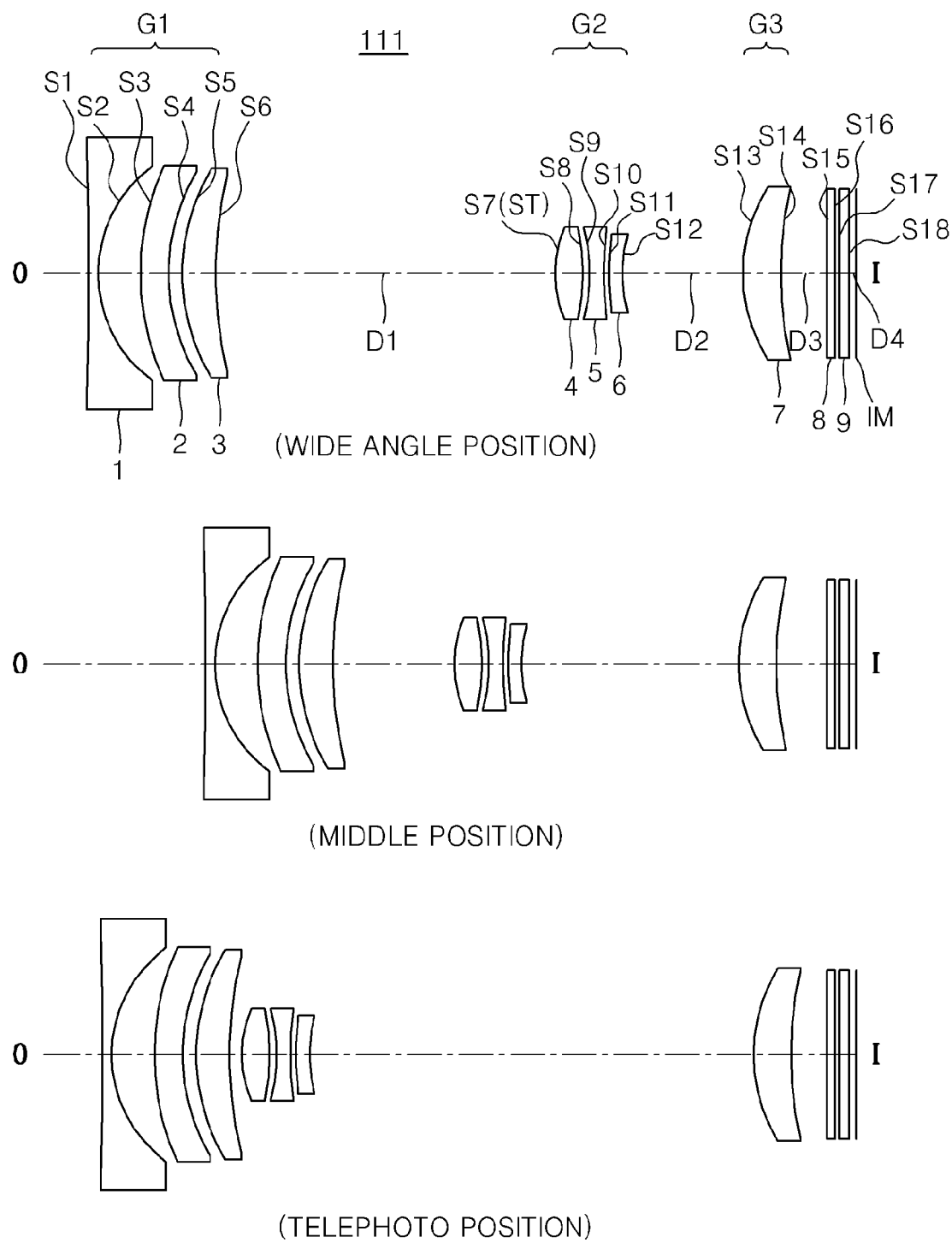
FIG. 5 illustrates optical arrangements of a zoom lens at a wide angle position, at a middle position, and at a telephoto position, according to another embodiment of the invention.

FIG. 5 illustrates optical arrangements of a zoom lens at the wide angle position, at the middle position, and at the telephoto position, according to Embodiment 3. Design data of Embodiment 3 is as follows.

TABLE 7 f; 4.75~9.39~19.47 Fno; 2.79~3.80~6.15 2ω; 79.48~45.62~22.93

| Lens surface | Radius of curvature (R) | Thickness (Dn) | Refractive index (Nd) | Abbe's number (Vd) |
|---|---|---|---|---|
| S1 | −220.386 | 0.500 | 1.604 | 60.3 |
| S2 | 6.652 | 2.092 | | |
| S3* | 12.211 | 1.43513 | 1.544 | 56.0 |
| S4* | 8.363 | 0.689 | | |
| S5* | 9.566 | 1.654 | 1.634 | 23.9 |
| S6* | 19.589 | D1 | | |
| S7 (ST) | 5.318 | 1.506 | 1.804 | 46.5 |
| S8 | −9.728 | 0.282 | | |
| S9 | −9.728 | 0.722 | 1.699 | 30.1 |
| S10 | 17.727 | 0.329 | | |
| S11* | 72.006 | 0.653 | 1.699 | 29.0 |
| S12* | 9.792 | D2 | | |
| S13* | 13.305 | 1.839 | 1.544 | 56.0 |
| S14* | −36.760 | D3 | | |
| S15 | infinity | 0.300 | 1.517 | 64.2 |

TABLE 7-continued f; 4.75~9.39~19.47 Fno; 2.79~3.80~6.15 2ω; 79.48~45.62~22.93

| Lens surface | Radius of curvature (R) | Thickness (Dn) | Refractive index (Nd) | Abbe's number (Vd) |
|---|---|---|---|---|
| S16 | infinity | 0.300 | | |
| S17 | infinity | 0.500 | 1.517 | 64.2 |
| S18 | infinity | D4 | | |

Data about the aspherical coefficient of the zoom lens according to Embodiment 3 is as follows.

TABLE 8

| Lens surface | K | A | B | C | D |
|---|---|---|---|---|---|
| S3 | −1.000000 | 1.530435E−03 | −8.758584E−05 | 1.902239E−06 | −2.143536E−08 |
| S4 | −1.000000 | 1.927707E−03 | −1.119676E−04 | 1.030179E−06 | 1.828892E−09 |
| S5 | −1.000000 | −1.251025E−04 | 1.205077E−05 | −8.793441E−07 | 2.733246E−08 |
| S6 | −1.000000 | −6.748441E−04 | 2.281994E−05 | −2.418321E−07 | 2.055442E−08 |
| S11 | −1.000000 | 3.228401E−03 | −3.711849E−04 | 3.919215E−05 | −3.638926E−06 |
| S12 | −1.000000 | 6.479171E−03 | −1.936654E−04 | 3.711987E−05 | −2.875648E−06 |
| S13 | −1.000000 | 1.930258E−03 | −7.364338E−05 | 2.541335E−06 | 0.000000E+00 |
| S14 | −1.000000 | 3.601860E−03 | −1.483940E−04 | 4.288132E−06 | 1.321110E−08 |

Data about a variable distance of the zoom lens according to Embodiment 3 during zooming is as follows.

TABLE 9

| Variable distance | Wide angle position | Middle position | Telephoto position |
|---|---|---|---|
| D1 | 17.050 | 6.026 | 0.632 |
| D2 | 6.110 | 11.001 | 22.340 |
| D3 | 2.384 | 2.572 | 1.850 |
| D4 | 0.400 | 0.400 | 0.400 |

Figure 6A:
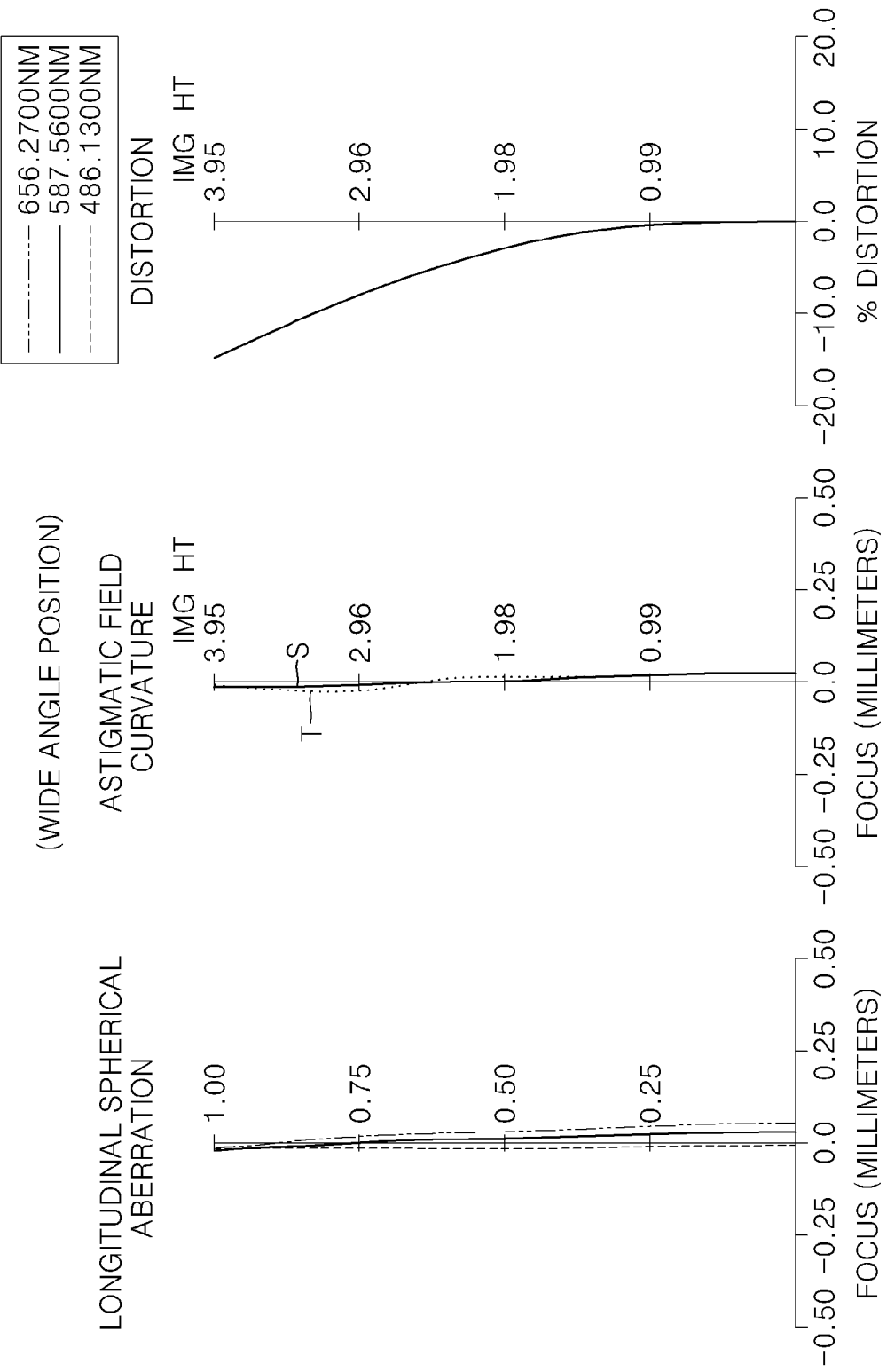

FIGS. 6A and 6B illustrate longitudinal spherical aberration, astigmatic field curves, and distortion of the zoom lens according to Embodiment 3, at the wide angle position and at the telephoto position, respectively.

Table 10 below shows that each of Embodiments 1-3 satisfies the above-described Expressions 1-6.

TABLE 10

| | Embodiment 1 | Embodiment 2 | Embodiment 3 |
|---|---|---|---|
| Expression 1 | 4.751 | 6.849 | 4.099 |
| Expression 2 | 5.592 | 8.376 | 2.846 |
| Expression 3 | 2.775 | 2.913 | 2.732 |
| Expression 4 | −1.834 | −1.804 | −2.031 |
| Expression 5 | 32.190 | 32.190 | 32.190 |
| Expression 6 | 4.368 | 12.978 | 3.825 |

A zoom lens according to an embodiment of the invention may have a high zoom magnification and may be manufactured to be compact at low costs. A zoom lens according to an embodiment of the invention may be applied to photographing devices such as digital still cameras, single-lens reflex cameras, video cameras, and portable terminals that use solid state image pickup devices, such as charge coupled devices (CCDs) or complementary metal-oxide semiconductors (CMOSs).

Figure 7:
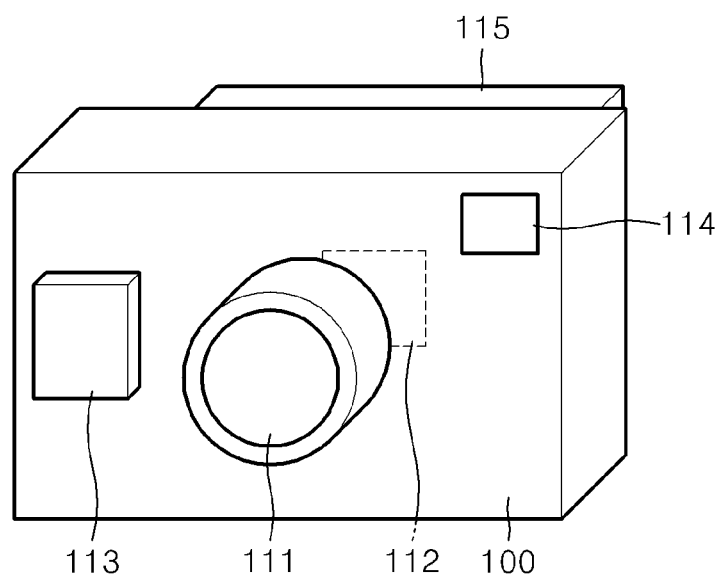
FIG. 7 is a perspective view of a photographing device according to an embodiment of the present invention.

FIG. 7 illustrates a photographing device 100 including the zoom lens 111, according to an embodiment of the invention. The photographing device 100 includes the above-described zoom lens 111, and an imaging device 112 for converting light focused by the zoom lens 111 into an electrical image signal. The photographing device 100 may include a recording unit 113 for storing information corresponding to a subject image obtained by the imaging device 112, and a view finder 114 for observing the subject image. The photographing device 100 may include a display unit 115 on which the subject image is displayed. Although the view finder 114 and the display unit 115 are separately included in the photographing device 100 in FIG. 7, only a display unit may be included in the photographing device 100 without separately including a view finder. The photographing device of FIG. 7 is only an example, and a zoom lens according to an embodiment of the invention may be applied to various optical apparatuses other than cameras. By applying a zoom lens according to an embodiment of the invention to photographing devices such as digital cameras as described above, small and low-priced optical apparatuses having a high magnification can be provided.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A zoom lens comprising:
a first lens group having a negative refractive power;
a second lens group having a positive refractive power; and
a third lens group having a positive refractive power, which are sequentially arranged in the direction from an object side to an image side,
wherein during zooming from a wide angle position to a telephoto position, the interval between the first lens group and the second lens group decreases, and the interval between the second lens group and the third lens group increases,
the first lens group comprises a first lens, a second lens which is a negative lens formed of plastic, and a third lens which is a positive aspherical lens formed of plastic,
the second lens group comprises a fourth lens, a fifth lens, and a sixth lens formed of plastic, and
the zoom lens satisfies the following expression:

$$4 \le \frac{ft}{fw} \le 7$$

where fw and ft denote the focal length of the zoom lens at the wide angle position and the focal length of the zoom lens at the telephoto position, respectively.

2. The zoom lens of claim 1, wherein the zoom lens satisfies the following expression:

$1.0 < (Ra+Rb)/(Ra-Rb) < 19.3$ where Ra denotes the radius of curvature of the surface of the second lens of the first lens group that faces the object side, and Rb denotes the radius of curvature of the surface of the second lens of the first lens group that faces the image side.

3. The zoom lens of claim 1, wherein the zoom lens satisfies the following expression:

$2 \le |f1|/fw \le 3$ where f1 denotes the focal length of the first lens group, and fw denotes the focal length of the zoom lens at the wide angle position.

4. The zoom lens of claim 1, wherein the zoom lens satisfies the following expression:

$-4 \le Nf/Pf \le -1$ where Nf denotes the focal length of the second lens of the first lens group, and Pf denotes the focal length of the third lens of the first lens group.

5. The zoom lens of claim 1, wherein the zoom lens satisfies the following expression:

$30 \le Nvd - Pvd \le 60$ where Nvd denotes the Abbe's number of the second lens of the first lens group, and Pvd denotes the Abbe's number of the third lens of the first lens group.

6. The zoom lens of claim 1, wherein the zoom lens satisfies the following expression:

$3 \le f3/fw \le 13$ where f3 denotes the focal length of the third lens group, and fw denotes the focal length of the zoom lens at the wide angle position.

7. The zoom lens of claim 1, wherein the first lens, the second lens, and the third lens are sequentially arranged in the direction from the object side to the image side.

8. The zoom lens of claim 7, wherein the first lens of the first lens group is a glass spherical lens.

9. The zoom lens of claim 7, wherein the first lens of the first lens group has a negative refractive power.

10. The zoom lens of claim 1, wherein the sixth lens is an aspherical lens.

11. The zoom lens of claim 1, wherein the fourth lens is a glass spherical lens.

12. The zoom lens of claim 11, wherein the fifth lens is a glass spherical lens.

13. The zoom lens of claim 12, wherein the fourth and fifth lenses are formed as a doublet lens.

14. The zoom lens of claim 1, wherein the third lens group comprises a plastic aspherical lens.

15. The zoom lens of claim 1, wherein the second lens group performs image blur correction.

16. The zoom lens of claim 1, wherein the first lens is a biconcave lens or a meniscus lens.

17. The zoom lens of claim 1, wherein the second lens is a meniscus lens which is convex toward the object side.

18. The zoom lens of claim 1, wherein the third lens is a meniscus lens which is convex toward the object side.

19. A photographing device comprising:
a zoom lens; and
an imaging device for converting an image obtained by the zoom lens into an electrical image signal,
wherein the zoom lens comprises a first lens group having a negative refractive power, a second lens group having a positive refractive power, and a third lens group having a positive refractive power, which are sequentially arranged in the direction from an object side to an image side, and during zooming from a wide angle position to a telephoto position, the interval between the first lens group and the second lens group decreases, and the interval between the second lens group and the third lens group increases, the first lens group comprises a first lens, a second lens which is a negative lens formed of plastic, and a third lens which is a positive aspherical lens formed of plastic, the second lens group comprises a fourth lens, a fifth lens, and a sixth lens formed of plastic, and the zoom lens satisfies the following expression:

$$4 \leq \frac{ft}{fw} \leq 7$$

where $f_w$ and $f_T$ denote the focal length of the zoom lens at the wide angle position and the focal length of the zoom lens at the telephoto position, respectively.

* * * * *